(12) United States Patent
Werdecker et al.

(10) Patent No.: US 8,920,878 B2
(45) Date of Patent: Dec. 30, 2014

(54) METHOD FOR PRODUCING A COATED QUARTZ GLASS COMPONENT

(75) Inventors: Waltraud Werdecker, Hanau am Main (DE); Gerrit Scheich, Obertshausen (DE); Christian Schenk, Ingelheim (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 464 days.

(21) Appl. No.: 13/501,137

(22) PCT Filed: Sep. 1, 2010

(86) PCT No.: PCT/EP2010/062794
§ 371 (c)(1),
(2), (4) Date: May 14, 2012

(87) PCT Pub. No.: WO2011/042262
PCT Pub. Date: Apr. 14, 2011

(65) Prior Publication Data
US 2012/0237685 A1    Sep. 20, 2012

(30) Foreign Application Priority Data
Oct. 10, 2009  (DE) .......................... 10 2009 049 032

(51) Int. Cl.
*B05D 3/02*  (2006.01)
*C03C 17/02* (2006.01)

(52) U.S. Cl.
CPC ............. *C03C 17/02* (2013.01); *C03C 2218/11* (2013.01)
USPC .................................................... 427/376.2

(58) Field of Classification Search
None
See application file for complete search history.

(56) References Cited

U.S. PATENT DOCUMENTS

| | | |
|---|---|---|
| 7,527,832 B2 | 5/2009 | Sakoste et al. |
| 2004/0172979 A1* | 9/2004 | Bhandarkar et al. ............ 65/395 |
| 2004/0216486 A1 | 11/2004 | Schwertfeger et al. |
| 2006/0246297 A1 | 11/2006 | Sakoste et al. |
| 2009/0266110 A1 | 10/2009 | Werdecker et al. |

FOREIGN PATENT DOCUMENTS

| | | |
|---|---|---|
| DE | 103 19 300 A1 | 11/2004 |
| DE | 10 2006 046 619 A1 | 4/2008 |
| WO | 2006 021416 A1 | 3/2006 |
| WO | 2006 115558 A2 | 11/2006 |

* cited by examiner

*Primary Examiner* — Nathan Empie
(74) *Attorney, Agent, or Firm* — Tiajoloff and Kelly LLP

(57) ABSTRACT

In a known method, a $SiO_2$ slip layer is applied to a basic quartz glass body by means of spraying on an $SiO_2$ slip, the slip layer is dried and sintered to form an $SiO_2$-containing functional layer. In order to permit the reproducible production of a functional quartz glass layer, even in the case of surfaces that are curved or inclined with respect to the vertical, having high layer thicknesses which satisfy high requirements on the layer homogeneity, the invention proposes that the slip contain the following components in a dispersion liquid: splintery, amorphous $SiO_2$ granules having a gain size distribution having a $D_{50}$ value in the range of 3 μm to 30 μm and having a proportion by weight of at least 10% by weight, based on the total solids content; spherical, amorphous $SiO_2$ particles having a particle size distribution having a $D_{50}$ value in the range of 1 μm to 50 μm and having a proportion by weight of at least 30% by weight, based on the total solids content; $SiO_2$ nano particles having particle sizes of less than 100 nm and having a proportion by weight between 0.2% and 10% by weight, based on the total solids content; and a non-ionic, alkali-free surfactant having a proportion in the range of 0.005 to 0.5%, based on the volume of the dispersion liquid.

18 Claims, No Drawings

METHOD FOR PRODUCING A COATED QUARTZ GLASS COMPONENT

The present invention relates to method for producing a coated component of quartz glass in that a base body of quartz glass is provided that has a coating surface onto which a SiO$_2$ slurry layer is applied by spraying a SiO$_2$ scurry thereon, drying the slurry layer to obtain a green body layer, and sintering the green body layer to obtain a SiO$_2$-containing functional layer.

PRIOR ART

Components of quartz glass are used for many applications, e.g. in lamp manufacture as cladding tubes, bulbs, cover plates, or reflector carriers for lamps and radiators in the ultraviolet, infrared and visible spectral range, in chemical apparatus engineering or in semiconductor production in the form of reactors and apparatus of quartz glass for the treatment of semiconductor components, trays, bell jars, crucibles, protective shields or simple quartz-glass components, such as tubes, rods, plates, flanges, rings or blocks.

For setting special surface properties or for improving the given mechanical, optical or chemical surface properties, the surface of the component is often modified in that the previously produced quartz glass component is provided completely or partially with a functional layer adapted to the specific purpose. Examples thereof are the improvement of the service life by a coating showing a higher softening temperature or better chemical resistance, a reduction of the contamination risk posed by the component by way of a coating consisting of a high-purity material, and a change in the heat insulation or reflectivity by transparent or opaque surfaces layers.

A method of the aforementioned type is known from DE 2004 051 846 A1. The publication describes the manufacture of a quartz glass component provided with a reflector layer. The reflector layer is produced by means of a slurry method in that highly filled, castable, aqueous slurry is produced that contains amorphous SiO$_2$ particles. The slurry is applied in the form of a slurry layer to the surface of a base body of quartz glass, which surface is to be coated.

For the application of the slurry layer to the base body, spraying, electrostatically supported spraying, flow coating, spinning, immersion and dispersion coating are suggested. The slurry layer is dried to form a green body layer and is subsequently sintered to form the reflector layer of opaque quartz glass.

The amorphous SiO$_2$ particles of the slurry are produced by wet grinding SiO$_2$ granules and have a mean particle size ranging from 1 μm to 50 μm. The solids content, the particle size and the particle size distribution of the SiO$_2$ particles of the slurry have impacts on the drying shrinkage of the slurry layer. The use of rather coarse SiO$_2$ particles can diminish the drying shrinkage and thus the risk of the formation of cracks during drying. With a simultaneously high solid content SiO$_2$ particles in the order of 1 μm to 50 μm show a good sintering behavior and a comparatively small drying shrinkage, so that the slurry layer can be dried and sintered without the formation of cracks.

However, it has been found that the flow behavior of the known, highly filled slurry for producing thick layers and layers on arched component surfaces or component surfaces inclined to the vertical is not suited for all application methods of the slurry layer. To improve the spreadability of the SiO$_2$ slurry, DE 10 2006 046 619 A1 suggests the addition of SiO$_2$ nanoparticles, namely with a weight fraction in the range of 0.2% by wt. to 15% by wt., based on the total solids content. Due to the addition of SiO$_2$ nanoparticles the flow behavior of the SiO$_2$ rather tends to show structural viscous thixoptropic characteristics, which improves the spreadability of the slurry and counteracts the flowing off from arched surfaces.

An even further fixation of the slurry layer is achieved with the help of the process described in DE 10 2005 058 819 A1 in that the slurry is applied together with a textile auxiliary means in the form of a quartz glass nonwoven or a cellulose strip to the surface to be coated. For instance, a quartz glass nonwoven impregnated with the SiO$_2$ slurry is applied to the surface to be coated and is then dried and sintered.

This procedure permits the manufacture of relatively thick layers on arched surfaces or surfaces inclined to the vertical, but has the drawback that the textile auxiliary means either remains in the coating or must be burnt out in a complicated way, both procedures entailing drawbacks and being not suited for applications where high demands are made on layer homogeneity.

TECHNICAL OBJECT

It is the object of the present invention to provide a method which allows the reproducible manufacture of a surface layer of quartz glass on a base body by simply spraying thereon a slurry layer also in the case of arched surfaces or surfaces inclined to the vertical with large layer thicknesses, and which satisfies the high demands made on layer homogeneity.

Starting from the aforementioned method, this object is achieved according to the invention in that the slurry contains the following components in a dispersion liquid:

(a) splintery amorphous SiO$_2$ granules with a grain size distribution having a D$_{50}$ value in the range between 3 μm and 30 μm, with a weight fraction of at least 10% by wt., based on the total solids content, (b) spherical amorphous SiO$_2$ particles with a particle size distribution with a D$_{50}$ value in the range between 1 μm and 50 μm, with a weight fraction of at least 30% by wt. based on the total solids content, (c) SiO$_2$ nanoparticles with particle sizes of less than 100 nm with a weight fraction between 0.2% by wt. and 10% by wt., based on the total solids content.

(d) a nonionic surfactant with a fraction in the range of from 0.005% to 0.5%, based on the volume of the dispersion liquid.

A spray slurry must fulfill requirements that are opposite to and exclude one another. On the one hand, the viscosity during spraying should be low to enable the spraying operation itself as well as a uniform distribution of the slurry layer, which is promoted by a low solids content. On the other hand, such a flow-off of the slurry layer from the surface as well as the formation of cracks during drying of the slurry layer should be avoided, which is promoted by a high solids content that is normally also accompanied by high viscosity. It has been found that the above-mentioned four components supplement one another as regards sprayability and adhesion of the SiO$_2$ slurry, which permits the manufacture also of thick homogeneous slurry layers by spraying a SiO$_2$ slurry without any auxiliary means onto surfaces of the base body that are arched, curved or inclined to the vertical.

The splintery SiO$_2$ granules contribute to the integrity of the sprayed-on slurry layer and to denticulation with the surface, thereby facilitating the production of relatively thick layers and improving the adhesion thereof to arched surfaces. Moreover, an addition of splintery granules changes the rheology of the slurry towards a more dilatant flow behavior. Dilatancy manifests itself in an increase in viscosity at increased shear forces independently of time. It has been found that the desired effect on denticulation and adhesion improvement presupposes a specific grain size distribution with a $D_{50}$ value between 3 μm and 30 μm and a content of at least 10% by wt. Splintery granules with a $D_{50}$ value of less than 5 μm increase the drying shrinkage of the slurry layer, and granules with a $D_{50}$ value of more than 30 μm counteract a high solids density in the slurry, which also contributes to an increased drying shrinkage. At a weight fraction of less than 10% by wt. the contribution to denticulation and adhesion improvement of the slurry layer is small. The splintery granules are produced in the easiest way by grinding, preferably by wet grinding.

The spray slurry is a composite slurry which, apart from the splintery $SiO_2$ granules, also contains a proportion of amorphous spherical $SiO_2$ particles. The higher the proportion of spherical particles is, the higher can be the solids density be set in the slurry layer after the spraying operation: this counteracts the formation of stresses during drying and sintering. The spherical $SiO_2$ particles have a particle size distribution with $D_{50}$ values between 1 μm and 50 μm. Spherical particles with a $D_{50}$ value of less than 1 μm increase the drying shrinkage of the slurry layer, and particles with a $D_{50}$ value of more than 50 μm rather counteract a high solids density in the slurry. At a low weight fraction of less than 30% by wt., the contribution to the desired high solid density in the spayed-on slurry layer is negligible. The spherical $SiO_2$ particles are produced in the easiest way by synthesis according to the CVD method and are commercially available.

The surfactant reduces the surface tension of the $SiO_2$ slurry, thereby increasing the viscosity thereof at low shear stresses. The addition of the surfactant thereby also changes the rheology of the slurry. It has been found that the $SiO_2$ slurry in the quiescent state and upon impact of small shear forces gets relatively solid, which counteracts a slipping off of the slurry layer on arched surfaces and also facilitates the manufacture of relatively thick layers. Surfactants, however, often contain impurities, particularly alkali-containing compounds. When quartz glass is heated, already small concentrations of such alkali compounds effect a crystallization while forming cristobalite. A cristobalite formation during sintering of the slurry layer may, however, lead to cracks and spalling of the layer because the thermal expansion coefficients of cristobalite and quartz glass are different. Therefore, according to the invention a nonionic, alkali-free surfactant is used, and the amount of surfactant in the slurry is kept as small as possible, namely in the range of 0.005-0.5 vol. % (based on the volume of the dispersion liquid). Suitable nonionic surfactants are e.g. fatty alcohol ethoxylates, fatty alcohol propoxylates, alkyl glucosides, alkyl polyglucosides, octylphenol ethoxylates or nonylphenol ethoxylates.

An addition of surfactant that is as small as possible is enabled according to the invention by the additional use of $SiO_2$ nanoparticles. Due to the addition of the $SiO_2$ nanoparticles the surface of the solid contained in the slurry is increased to a relatively great extent, which improves the action of the surfactant. In this respect the $SiO_2$ nanoparticles act for the surfactant as 'activator', so that relatively small amounts of surfactant are needed. Nanoparticles consist typically of a bond of a few thousands of $SiO_2$ molecules and usually have a BET specific surface area in the range of from 50-400 $m^2/g$. At a content of less than 0.2% by wt. of said particles in the slurry the nanoparticles have no significant impact on the increase in the solid surface in the slurry, whereas contents of more than 10% by wt. lead to an enhanced shrinkage of the slurry layer during drying, which shrinkage may aggravate a defect-free drying and sintering. The nanoparticles seal the outer surface of the green body and bring about an increase in the green strength of the dried slurry and in the sintering activity.

Splintery $SiO_2$ granules, spherical $SiO_2$ particles and $SiO_2$ nanoparticles add up, apart from possible dopants and impurities, to 100% by wt. of the $SiO_2$ solids content.

The base body consists of synthetically produced quartz glass or of quartz glass produced from naturally occurring raw materials. The quartz glass may be transparent or opaque (translucent).

After the slurry layer has been dried, the vitreous $SiO_2$ functional layer is obtained without any tools by sintering (melting) the green body layer. Sintering or sintering of the dried green body layer is carried out by heating in a furnace, or by means of a combustion flame, by means of plasma or arc or by means of a laser having a predetermined working wavelength. The green body layer may here contain a component that absorbs the working wavelength of the laser or plasma radiation, so that the heat impact during densification is short in time and is locally restricted, and plastic deformations or the introduction of thermal stresses can be predominantly avoided. The component which preferably absorbs the plasma or laser radiation is an additive in the form of particles of a chemical composition differing from $SiO_2$, or doped amorphous $SiO_2$ particles, or boundaries on which the plasma or laser radiation shows diffuse reflection and is thereby absorbed.

Depending on the application, the sintered functional layer is transparent or is completely or partly opaque and is distinguished at any rate by the absence of cracks and by high adhesion on the quartz glass of the base body. In its properties it can be modified by simple method modifications, e.g. the sintering temperature or the addition of dopants for a multitude of concrete applications, e.g. for the use in semiconductor manufacture or in lamp and reactor manufacture.

The $SiO_2$ functional layer is normally configured in the form of a flat layer, but it may also have a geometry which forms a functional part of the component, e.g. as a thickening or a bead.

It has turned out to be advantageous when the splintery amorphous $SiO_2$ granules are present at a weight fraction in the range of 20-60% by wt., based on the total solids content, and when the splintery amorphous $SiO_2$ granules have a grain size distribution with a $D_{50}$ value in the range between 5 μm and 20 μm.

The amount and the grain size distribution of the splintery granules constitute an appropriate compromise between improvement of the adhesion and integrity of the slurry layer on the one hand and a solid density as high as possible as well as a small tendency to cracking of the slurry layer or the green body layer on the other hand.

In this respect a procedure has also turned out to be advantageous where the spherical amorphous $SiO_2$ granules are present at a weight fraction in the range of 40-80% by wt., based on the total solids content, and the spherical amorphous $SiO_2$ granules have a grain size distribution with a $D_{50}$ value in the range between 5 μm and 40 μm.

As for a drying shrinkage that is as small as possible, and a contribution to the "activation" of the surfactant that is a great as possible, it has turned out to be advantageous when the $SiO_2$ nanoparticles are present at a weight fraction in the range of 3-8% by wt., based on the total solids content.

A method variant is preferred in which the surfactant is present with a fraction in the range of 0.005-0.04%, based on the volume of the dispersion liquid.

Owing to the relatively small amount of surfactant in the dispersion liquid, a contamination of the $SiO_2$ slurry layer with impurities is prevented. In connection with the additional addition of $SiO_2$ nanoparticles the relatively small surfactant concentration effects a fast solidification of the slurry layer after spray application also in the case of a sprayable slurry of low viscosity, thereby permitting the application of a uniform and firmly adhering slurry layer, which is to be dried without any cracks, to the base body surface by means of spraying methods.

A mixture of water and an organic solvent with a lower boiling temperature, preferably an alcohol, is preferably used as the dispersion liquid.

Part of the dispersing agent/water is here replaced by an organic solvent having a lower boiling temperature than water. Due to the lower boiling temperature the slurry is dried at the same liquid amount more quickly than in the case of a purely aqueous dispersing agent; especially also already when the slurry layer is sprayed on. This leads to a faster fixation of the slurry layer to the surface, which counteracts a flowing off of the slurry layer. Hence, a sufficiently high liquid amount guarantees the sprayability of the slurry and, on the other hand, a comparatively high solids content is achieved in the slurry layer. The complete replacement of the water by an organic solvent may lead to a rapid drying off of the slurry layer and to cracks. The organic solvent with a lower boiling temperature than water is preferably a low-boiling alcohol, such as ethanol or propanol. Suitable mixing ratios have to be determined empirically. In the case of ethanol suitable proportions are in the range of 10-75 vol. % of the total volume of the dispersion liquid, particularly preferably in the range between 23 vol. % and 40 vol. %.

It has also turned out to be advantageous when the solids content of the $SiO_2$ slurry is in the range between 70-80% by wt., preferably between 74-78% by wt.

A solids content that is as high as possible contributes to a uniform and small shrinkage of the slurry layer, so that drying and sintering cracks are avoided. At solids contents of less than about 10% by wt., drying cracks may easily occur. On the other hand, the sprayability of the slurry requires a low viscosity and thus a low solids content. At solids contents of more than 78% by wt. the sprayability of the slurry is restricted. It has been found that at a solids content within the said ranges the sprayed-on slurry layer can be dried without the formation of cracks.

The $SiO_2$ content of the amorphous $SiO_2$ particles is preferably at least 99.99% by wt. This is true for both the splintery $SiO_2$ granules and the spherical $SiO_2$ particles. The solids content of the slurry produced by using such $SiO_2$ particles consists of at least 99.99% by wt. of $SiO_2$. Binders or similar additives are not intended. The content of metallic impurities is preferably less than 1 wt. ppm. This starting material does not pose any contamination or crystallization risk. The cristobalite amount in the dried $SiO_2$ slurry layer (=green body layer) should not be more than 0.1% by wt. because, otherwise, crystallization may occur during sintering, which may lead to component rejects.

In a particularly preferred method variant it is intended that a plurality of successive layers of the $SiO_2$ slurry layer are applied for producing the functional layer.

Particularly thick functional layers and functional layers with specifically adapted properties can in particular be produced in this way.

In the light of this, preference is given to a procedure in which neighboring layers have different compositions.

Depending on the composition of the respective slurry layers and the treatment parameters, such as the temperature during sintering, one can produce functional layer portions of different porosity or with different property gradients over the thickness of the functional layer. For instance, it is possible to produce an inner layer of high porosity that has reflecting properties and an outer layer that is transparent and leads to the sealing of the coating surface. Neighboring layers can particularly differ from one another in the amounts of splintery granules, amorphous particles and nanoparticles and their size distributions.

The simple spraying of the $SiO_2$ slurry modified according to the invention particularly also facilitates the production of relatively thick functional layers, so that the method is preferably used for producing a functional layer having a layer thickness in the range between 0.1 mm and 4 mm.

The coating surface of the base body can be heated during spraying of the slurry layer, for instance to a temperature in the range of 100° C. to 1000° C., preferably to a temperature in the range of 300° C. to 800° C. The slurry layer is here applied to a hot coating surface, e.g. to a base body which is heated in a furnace, or to a strand-shaped base body which is drawn in a drawing process from a crucible or a preform. Due to the high temperature of the base body the dispersion liquid evaporates relatively quickly, which counteracts a flowing off of the slurry mass. The application of the slurry layer and the drying operation for obtaining the green body layer are carried out substantially simultaneously. The temperature of the coating surface can even be so high that a certain thermal solidification of the slurry layer or the green body layer occurs immediately.

EMBODIMENT

The invention will now be explained with reference to embodiments.

1. Preparation of a $SiO_2$ Basic Slurry with Splintery $SiO_2$ Granules

For a batch of 10 kg basic slurry (dispersion liquid consisting of 70 vol. % of deionized water and 30 vol. % of ethanol+ $SiO_2$ granules), 7.5 kg amorphous quartz glass granules of natural raw material with grain sizes in the range between 250 µm and 650 µm are mixed with 2.5 kg deionized water of a conductivity of less than 3 µS in a drum type mill which is lined with quartz glass and has a volume of about 20 liters. The quartz glass granules were cleaned in a hot chlorination process before; attention is paid that the cristobalite content is below 1% by wt.

This mixture is ground by means of grinding balls of quartz glass on a roller support at 23 rpm for a period of three days to such a degree that a homogeneous basic slurry with a solids content of 75% is formed. In the course of the grinding process, the pH is lowered to about 4 due to the dissolving $SiO_2$.

The $SiO_2$ granule particles obtained after the grinding of the quartz glass granules are of a splintery type and have a particle size distribution that is distinguished by a $D_{50}$ value of about 8 µm and by a $D_{90}$ value of about 40 µm. The basic slurry produced in this way shows a rather dilatant flow behavior.

2. Preparation of a SiO$_2$ Basic Slurry with Spherical SiO$_2$ Granules

SiO$_2$ nanoparticles with diameters of about 40 nm (also called "pyrogenic silica" hereinafter) and commercial, spherical, amorphous SiO$_2$ particles are mixed into a dispersion liquid consisting of 70 vol. % of deionized water and 30 vol. % of ethanol, and are homogenized to obtain a further basic slurry.

The spherical amorphous SiO$_2$ particles are produced synthetically and are present in standardized particle size distributions with D$_{50}$ values of 5 μm, 15 μm, 30 μm and 40 μm. The particle size distribution is each time distinguished by a relatively narrow maximum of the size distribution in the range of the respective D$_{50}$ value and by a secondary maximum in the range of about 2 μm.

The particles are first of all cleaned in a hot chlorination process. The contamination content of the purified raw-material components is small and is all in all less than 1 wt. ppm. Especially the content of Li$_2$O is less than 10 wt ppb. These raw material components are used in the following formulation, each raw material component being designated with the letter R and its respective D$_{50}$ value as appendix:

Formulation:

| | |
|---|---|
| R$_{30}$ | 250 g |
| R$_{15}$ | 500 g |
| R$_5$ | 200 g |

Pyrogenic silica: 50 g with BET surface area of 60 m$^2$/g

These raw material components are dispersed in deionized water having a conductivity of less than 3 μS, resulting in a solids content of 75% by wt. The basic slurry produced in this way shows a thixotropic flow behavior.

3. Preparation of a Spray Slurry

A spray slurry is produced by mixing and homogenizing proportions of the first, rather dilatant, basic slurry with splintery granules of naturally occurring raw material and of the second, rather thixotropic, basic slurry with amorphous particles of synthetically produced SiO$_2$. The mixing ratio depends primarily on the desired thickness of the functional layer to be produced and on the degree of curvature or inclination of the coating surface. The greater the desired thickness, the more inclined is the coating surface and the greater is the proportion of the first basic slurry.

In the embodiment a functional layer is produced with a desired thickness of 2 mm on the outside of a dome-shaped quartz glass reactor, as is used for etching or CVD processes in semiconductor production. The quartz glass reactor has an outer diameter of 420 mm, a height of 800 mm, and a wall thickness of 4 mm.

For this intended use, 1 proportion of the first basic slurry is mixed with 2 proportions of the second basic slurry. 0.015 vol. % (based on the volume of the water) of a nonionic surfactant is added to this mixture. After homogenization one obtains a spray slurry which is distinguished by the following properties:

component K1: weight fraction (based on the total solids content) of splintery, amorphous SiO$_2$ granules consisting of natural quartz glass with a grain size distribution with a D$_{50}$ value of 80 μm: 33% component K2: weight fraction (based on the total solids content) of spherical, synthetically produced amorphous SiO$_2$ particles with a grain size distribution with a D$_{50}$ value of about 15 μm: 63.5% component K3: weight fraction (based on the total solids content) of SiO$_2$ nanoparticles with particle sizes of about 40 nm: 3.5% component K4: surfactant: 0.015 vol. % (based on the liquid volume of the spray slurry)

component K5 dispersing agent: 70 vol. % H$_2$O/30 vol. % ethanol solids content: 75% by wt.

Coating of a Dome-Shaped Quartz-Glass Reactor

The quartz-glass reactor is introduced into a spray chamber. Subsequently, the outer wall is completely provided, except for a flange arranged on the underside of the reactor, with a SiO$_2$ slurry layer of a thickness of about 4 mm in successive order by spraying of the spray slurry. A spray gun which is continuously fed with the spray slurry is used for this operation.

The slurry layer applied in this way is slowly dried by allowing it to stand in air for several hours. Complete drying is carried out by using an IR radiator in air. The dried greenbody layer is subsequently sintered in a known manner in a sintering furnace at a temperature of about 1200° C. to obtain a crack-free, homogeneous SiO$_2$ reflector layer of opaque quartz glass with a density of about 1.6 g/cm$^3$.

The homogeneity of the layer manifests itself as a substantially uniform layer thickness without the formation of "noses" that are created by the slurry flowing off from the curved surface. Opacity manifests itself in that the direct spectral transmission in the wavelength range between 200 nm and 2500 nm is below 5%. When the green body layer is sintered, the constituents of the surfactant will disappear almost completely.

The slurry described above by way of example and the results of the coating test obtained by using this slurry and of further coating tests with other slurry compositions are listed in Table 1.

EMBODIMENT

TABLE 1

| No. | K1 | K2 | K3 | K4 | K5 | "R" | "H" |
|---|---|---|---|---|---|---|---|
| 1 | 33/8 | 63.5/15 | 3.5/0.04 | 0.015 | 25/(70/30) | ++ | ++ |
| 2 | 20/8 | 63.5/15 | 3.5/0.04 | 0.015 | 25/(70/30) | + | 0 |
| 3 | 15/8 | 63.5/15 | 3.5/0.04 | 0.015 | 25/(70/30) | 0 | − |
| 4 | 33/8 | 40/15 | 3.5/0.04 | 0.015 | 25/(70/30) | 0 | + |
| 5 | 33/8 | 35/15 | 3.5/0.04 | 0.015 | 25/(70/30) | − | 0 |
| 6 | 33/8 | 63.5/15 | 0 | 0.015 | 25/(70/30) | + | − |
| 7 | 33/8 | 63.5/15 | 10/0.04 | 0.015 | 25/(70/30) | − | + |
| 8 | 33/8 | 63.5/15 | 3.5/0.04 | 0 | 25/(70/30) | 0 | − |
| 9 | 33/8 | 63.5/15 | 3.5/0.04 | 0.015 | 33/(70/30) | − | − |
| 10 | 33/8 | 63.5/15 | 3.5/0.04 | 0.015 | 20/(70/30) | + | 0 |
| 11 | 33/20 | 63.5/15 | 3.5/0.04 | 0.015 | 25/(70/30) | 0 | ++ |
| 12 | 33/8 | 63.5/40 | 3.5/0.04 | 0.015 | 25/(70/30) | 0 | ++ |

Explanations regarding Table 1:

Components K1, K2, K3: concentration data given in wt. % (based on the solids content of the slurry)/mean particle size in μm (D$_{50}$ value)

Component K4: concentration of "Triton X-100" in vol. % (based on the liquid volume of the spray slurry)

Component K5: weight fraction of the dispersion liquid in wt. %/fractions of water and alcohol (in vol. % based on the total volume of the dispersion liquid)

"R" is a qualitative measure of the visually detected crack formation of the dried slurry layer.

"H" is a qualitative measure of the visually detected homogeneity of the dried slurry layer.

Samples nos. 3 and 5 to 9 are comparative examples.
Symbols of the qualitative assessment: ++ very good
+ good
0 acceptable
− poor The qualitative results of Table 1 demonstrate that when using a slurry layer with the composition according to sample 1, one will obtain a quartz-glass component with a particularly homogeneous and low-crack $SiO_2$ surface layer.

The invention claimed is:

1. A method for producing a coated component of quartz glass, said method comprising:
   providing a base body of quartz glass that has a coating surface;
   applying onto said coating surface a $SiO_2$ slurry layer by spraying a $SiO_2$ slurry thereon;
   drying the slurry layer so as to obtain a green body layer, and
   sintering the green body layer so as to obtain a $SiO_2$-containing functional layer,
   wherein the slurry contains the following components in a dispersion liquid:
   (a) splintery amorphous $SiO_2$ granules with a gain size distribution having a $D_{550}$ value in a range between 3 μm and 30 μm, wherein the splintery amorphous $SiO_2$ granules are present with a weight fraction in a range of 20% by wt. to 60% by wt., based on the total solids content,
   (b) spherical amorphous $SiO_2$ particles with a particle size distribution with a $D_{50}$ value in a range between 1 μm and 50 μm, with a weight fraction of at least 30% by wt., based on the total solids content,
   (c) $SiO_2$ nanoparticles with particle sizes of less than 100 nm with a weight fraction between 0.2% by wt. and 10% by wt, based on the total solids content,
   (d) a non-ionic, alkali-free surfactant with a fraction in a range from 0.005% to 0.5%, based on the volume of the dispersion liquid.

2. The method according to claim 1, wherein the spherical amorphous $SiO_2$ granules are present with a weight fraction in a range of 40% by wt. to 80% by wt., based on the total solids content.

3. The method according to claim 1, wherein the spherical amorphous $SiO_2$ granules have a grain size distribution with a $D_{50}$ value in a range between 5 μm and 40 μm.

4. The method according to claim 1, wherein the $SiO_2$ nanoparticles are present with a weight fraction in a range of 3% by wt. to 8% by wt., based on the total solids content.

5. The method according to claim 1, wherein the surfactant is present with a fraction in range of 0.005% to 0.05%, based on the volume of the dispersion liquid.

6. The method according to claim 1, wherein the dispersion is a mixture of water and an organic solvent with a lower boiling temperature than water.

7. The method according to claim 1, wherein the solids content of the $SiO_2$ slurry is in a range between 70-80% by wt.

8. The method according to claim 1, wherein a plurality of successive layers of the $SiO_2$ slurry layer are applied so as to produce the functional layer.

9. The method according to claim 8, wherein neighboring layers have different compositions.

10. The method according to claim 1, wherein the functional layer is produced with a layer thickness in the range between 0.1 mm and 4 mm.

11. The method according to claim 1, wherein the dispersion liquid is a mixture of water and an alcohol with a lower boiling temperature than water.

12. The method according to claim 1, wherein the solids content of the $SiO_2$ slurry is in a range between 74-78% by wt.

13. The method according to claim 1, wherein the splintery amorphous $SiO_2$ granules have a grain size distribution with a $D_{50}$ value in a range between 5 μm and 20 μm.

14. The method according to claim 13, wherein the spherical amorphous $SiO_2$ granules are present with a weight fraction in a range of 40% by wt. to 80% by wt., based on the total solids content.

15. The method according to claim 14, wherein the spherical amorphous $SiO_2$ granules have a grain size distribution with a $D_{50}$ value in a range between 5 μm and 40 μm.

16. The method according to claim 15, wherein the $SiO_2$ nanoparticles are present with a weight fraction in a range of 3% by wt. to 8% by wt., based on the total solids content.

17. The method according to claim 16, wherein the surfactant is present with a fraction in a range of 0.005% to 0.05%, based on the volume of the dispersion liquid.

18. The method according to claim 17, wherein a plurality of successive layers of the $SiO_2$ slurry layer are applied so as to produce the functional layer.

* * * * *